United States Patent [19]

Morgan, Jr.

[11] 4,104,961
[45] Aug. 8, 1978

[54] BRAKE SHOE LINING BONDING FIXTURE

[75] Inventor: Thomas E. Morgan, Jr., Bloomfield Hills, Mich.

[73] Assignee: Leonard Friedman, Beverly Hills, Calif.

[21] Appl. No.: 792,150

[22] Filed: Apr. 29, 1977

[51] Int. Cl.² ............................................. B02C 11/08
[52] U.S. Cl. ............................ 100/93 PB; 269/321 B
[58] Field of Search ................... 100/93 PB; 269/153, 269/321, 321 B; 156/228

[56] References Cited

U.S. PATENT DOCUMENTS

| | | | |
|---|---|---|---|
| 2,976,909 | 3/1961 | Parker | 100/93 SB |
| 3,638,560 | 2/1972 | Morgan, Sr. et al. | 100/93 SB |
| 3,752,062 | 8/1973 | Morgan, Sr. et al. | 100/93 SB |

Primary Examiner—Leonard D. Christian
Attorney, Agent, or Firm—Barnes, Kisselle, Raisch & Choate

[57] ABSTRACT

A brake shoe lining bonding fixture wherein a brake shoe support is encompassed by a tension band which has a shoe support with radial finger locators and buffer pads at each end of the shoe to carry the band near the ends of the pressured brake lining to prevent corner crushing of the lining. A pressure bar to urge the shoe support against the tension band is interengaged with guide slots on the shoe support and lies in contact with a heavy leaf spring to maintain pressure when mechanically applied and locked in to the shoe support mechanism.

4 Claims, 4 Drawing Figures

BRAKE SHOE LINING BONDING FIXTURE

This invention relates to a Brake Shoe Lining Bonding Fixture and more particularly to that type of apparatus in which a brake shoe lining is bonded to a brake shoe under the conditions of heat and pressure to eliminate the need for riveting.

BACKGROUND OF INVENTION

For quite some time, it has been known to bond brake shoe linings to the curved surface of a brake shoe which is sometimes called a brake shoe table. This bonding is done with a special adhesive which is applied to the contacting surfaces after which pressure is applied around the surface of the brake shoe and the entire fixture is passed through a heating oven which causes a setting of the bonding material. Other related patents on this subject are U.S. Pats. to Morgan et al, No. 3,638,560, and Morgan et al 3,752,062.

The present invention relates to an improvement in what might be called the band type device in which reinforcing structures are provided for the brake shoe itself and a band is placed around the outside to clamp the brake shoe lining prior to heating.

One of the problems in connection with this type of device has been the elimination of the crushing of the corners of the brake shoes where the band passes around the lining and also to eliminate undue strain on the band itself to prevent distortion and breaking.

Another problem has been the method of holding the band pressure while the device is being passed through the heat zone.

It is an object of the present invention to provide a base support for a brake shoe which provides ample structural strength to prevent distortion of the brake shoe while permitting the passage of heat into the bonding areas.

It is a further object to provide a device in which the pressure can be applied and maintained during the heating cycle and yet easily released when the bonding is complete.

Other objects and features of the invention relating to details of construction and operation will be apparent in the following description and claims in which the principals of the invention are set forth together with details of the structure which would enable a person skilled in the art to practice the invention all in connection with the best mode presently contemplated.

DETAILED DESCRIPTION

Figure 1:
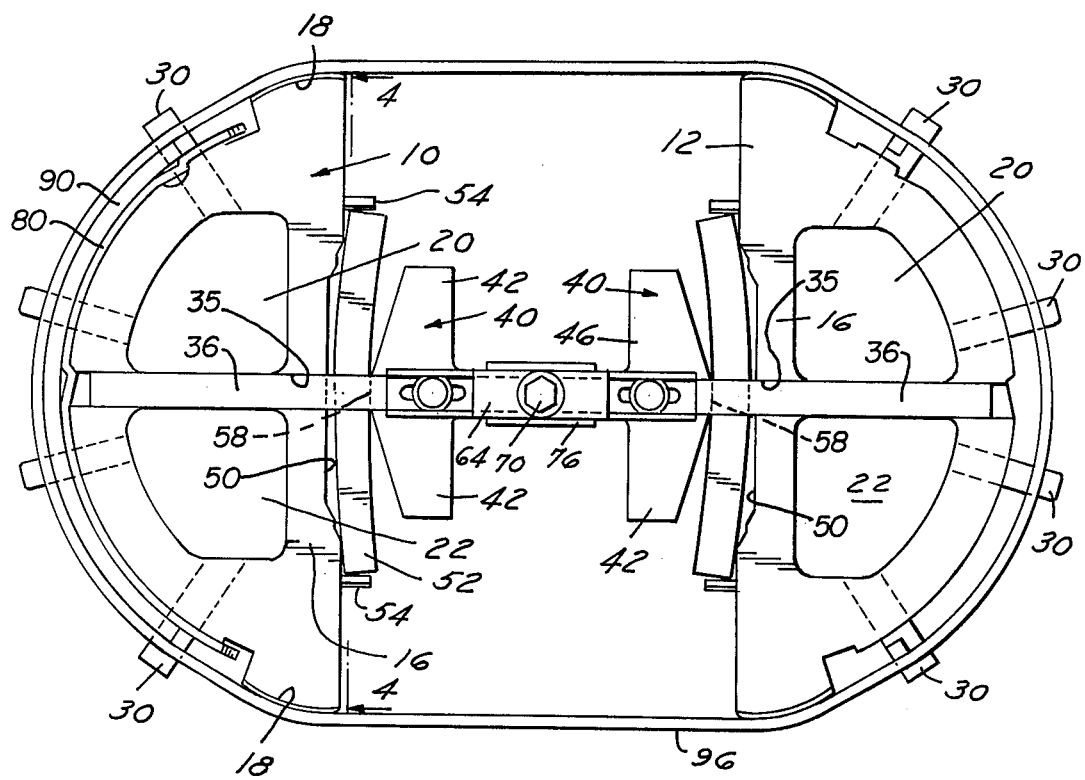
FIG. 1, a plan view of an assembled device showing the various parts.

With reference to the drawings, in FIG. 1, two brake shoe support fixtures 10 and 12 are shown in opposed relationship at each end of the figure. Each unit consists of an arcuate wall 14 which extends from a horizontal diametrical bar 16 that terminates in curved surfaces 18. This structure results in openings 20 and 22 which allow the passage of air and circulation through the device.

Figure 3:
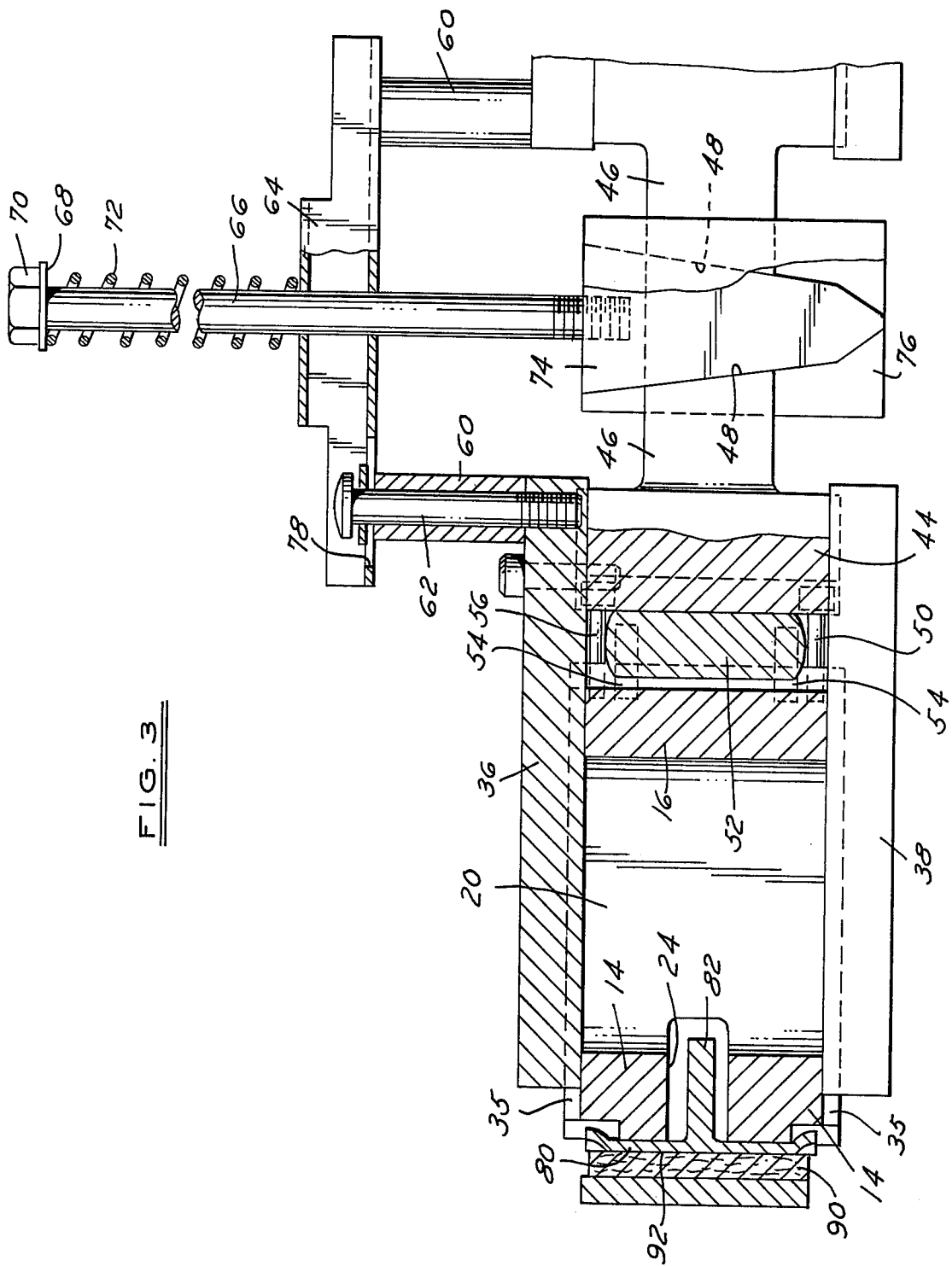
FIG. 3, a side view, partially in section, of one-half of the device illustrating the holding mechanism taken on line 3—3 of FIG. 2.

The arcuate elements 14 are slotted at 24 in an arcuate slot which extends around to penetrate also the solid diametrical bar 10 at the ends. Each of the arcuate elements 14 is provided with semicircular surface slots 26 which facilitate the flow of air during the heating cycle in addition to the open slot 24. The bottom arcuate member 14, illustrated in FIG. 3, has spaced radial lugs 30 which project therefrom to provide a supporting ledge for a brake shoe which is mounted on the device.

A solid reinforcing strut 32 extends between the diametrical bar 16 and the center of the semi-circular runs 14 to provide a rigid support and it will be seen that forward of each of the surfaces 18 is a shoulder 34 which provides room for the brake shoe and the brake lining to seat within the circumferential confines of the two surfaces 18. Above and below the reinforcing bar or wall 32 are surface slots 35 which serve as guides.

Extending toward the center of the assembly, as shown in FIG. 1, directly above and below the reinforcing strut 32, are straight upper and lower bars 36 and 38, the central ends of which are rigidly attached to a crosspiece 40 composed of spaced wings 42 connected by a rigid central pillar 44 which has an inwardly projecting pressure lug 46 with an angled face 48. The upper and lower bars 36 and 38 are dimensioned to slide in the slots 32 so that the assembly, which is composed of these bars 36 and 38 and the central member 40, will slide back and forth in relation to the basic brake shoe support.

A surface recess 50 is formed in the front face of the diametrical bars 16 and in front of this recess is mounted an extremely heavy leaf spring element 52 loosely retained endwise by recessed studs 54 and retained against dislodgement by headed bolts 56. It will be noted that the wings 42 are angled back toward a central portion 58 which bears against the central area of the spring 52.

Figure 4:
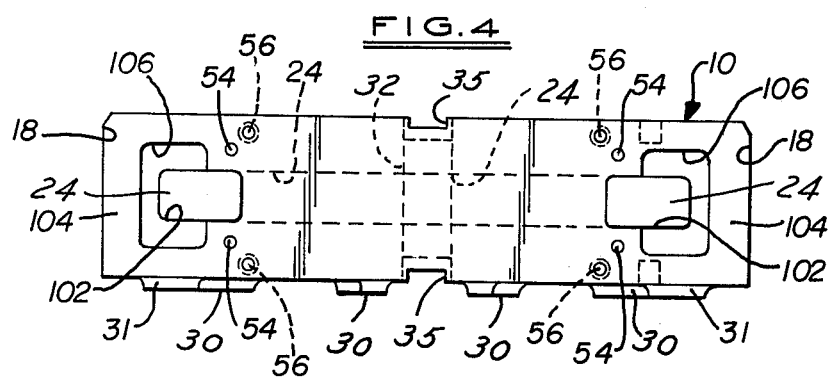
FIG. 4, a view on line 4—4 of FIG. 1.

In FIG. 4, there is illustrated a view of one of the support fixtures 10 taken at a chordal face on line 4—4 of FIG. 1. The spaced radial, bottom-support lugs 30, shown in FIGS. 1 and 2, appear at the bottom of FIG. 4 as do also round support pads 31 shown in dotted lines in FIG. 2. A cored open cavity 106 (shown in dotted lines in FIG. 2) substantially rectangular in shape appears at each side of the face of the fixture 10 and a rectangular window 102 appears in the cavity 106 by reason of the arcuate slot 24 which extends around the entire fixture except for the vertical pillars 104 adjacent the chordal face of the fixture. The pins 54 shown in FIG. 1 also are shown in FIG. 4 as well as the holes for the headed bolts 56 shown in FIG. 2. Centrally of FIG. 4 is a radial rib 32 shown in dotted lines and underlying the operating groove 35 for the slide bar 36 shown in FIGS. 1 and 2.

Figure 2:
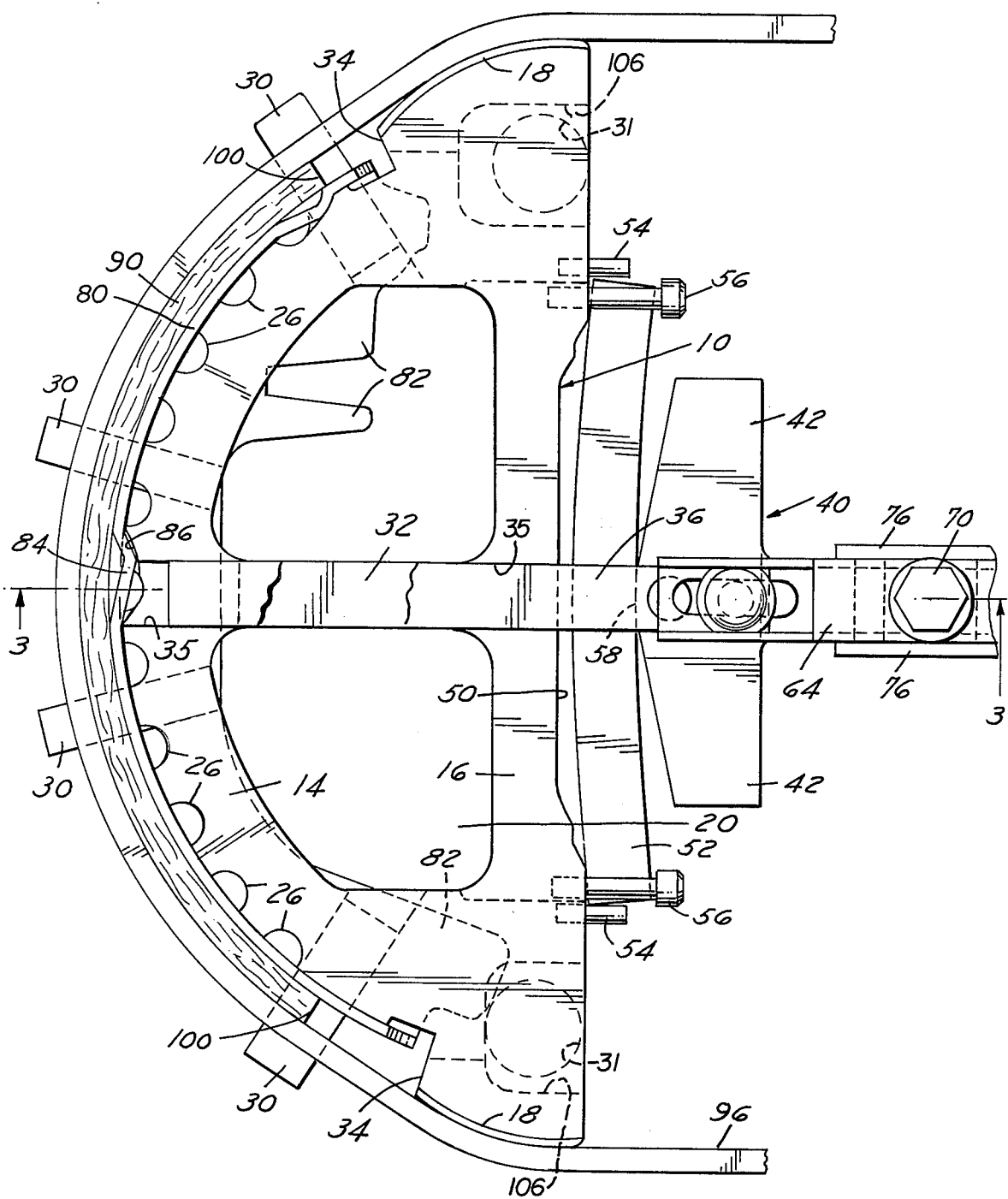
FIG. 2, an enlarged view of one end of the device showing greater detail.

As shown best in FIG. 2, central tubular risers 60 are held by bolts 62 on the forward end of bars 36 to form pillars for a bridging cross-piece 64 which carries a vertically disposed rod 66 having a washer and nut 68 and 70 respectively at the top end and carrying a coil spring 72. At the bottom of this rod 66 is a wedge 74 which has opposed sides angled to conform to the angles of the extensions 46. On each side of the wedge 74 are guide plates 76. The bolt 62 is retained in a slot 78 in the bridge portion 64 to allow a limited free movement.

In the operation of the device, a brake shoe is first assembled on the arcuate support 14. This brake shoe 80 has a central web which is illustrated at 82, this web extending into the slot 24 between the portions 14 of the arcuate support. A small indentation or deformation 84 interfits in a suitable recess 86 to locate the brake shoe. The brake lining 90 is then placed on the brake shoe or the two may be pre-assembled if desired with the bonding material interposed in the area 92 between the lining and the brake shoe.

A similar assembly is made at the other end although in FIG. 1 the device is shown without a part at the right-hand end. Then a closed band 96 is placed around the assembly and a suitable expanding device is applied to the wings 42 to tighten the entire assembly against the constraint of the band. The tightening device for this type of thing is illustrated in the two patents above referenced in the introduction. Once the prescribed pressure has been placed on the assembly, the wedge 74 is dropped into place between the projections 46 to maintain the pressure on the assembly. The pressurizing mechanism can then be released and the entire fixture handled as a unit and passed through a heating oven on a suitable conveyor.

A significant part of the present invention is the curved surfaces 18 to serve as buffers for the band support and which are dimensioned such that they have an effective diameter 0.010 inch less than the brake lining diameter. This insures that adequate pressure is placed on the lining against the brake shoe but prevents a braking of the corners shown at 100 which otherwise happens when the band is not properly supported as it comes off the brake lining. The apparatus described allows the application of extremely high pressures to the brake lining during the heating cycle and yet provides ample support to prevent damage to the linings under these great pressures which may range from 2500 to 6000 pounds per square inch.

I claim:

1. In a brake shoe lining fixture for bonding brake linings on to brake shoes utilizing an arcuate brake shoe support and an encircling metal band to exert pressure on the lining against the brake shoe, that improvement which comprises:

a brake shoe support arcuate in shape having an arcuate recess to receive a brake shoe, and buffer blocks at the end of said recess having a circumferentially extended curved surface circumferentially adjacent and tangential to the outer end surface of an assembled brake lining to carry the pressure band tangentially away from the curve at the end of the brake linings, said buffer block surfaces having a radial dimension slightly less than the curvature of the assembled brake linings to protect the corner ends of the brake lining against crushing.

2. A fixture as defined in claim 1 in which the tangential buffer block surface is about 0.010 inch less than the curvature of the assembled brake lining.

3. In a brake shoe lining fixture for bonding brake linings on to brake shoes utilizing an arcuate brake shoe support and an encircling metal band to exert pressure on the lining against the brake shoe, that improvement which comprises:

a brake shoe support arcuate in shape having an arcuate recess to receive a brake shoe, buffer blocks at the end of said recess having a circumferentially extended curved surface circumferentially adjacent and tangential to the outer end surface of an assembled brake lining to carry the pressure band tangentially away from the curve at the end of the brake linings, said buffer block surfaces having a radial dimension slightly less than the curvature of the assembled brake linings to protect the corner ends of the brake lining against crushing, the brake shoe support having spaced projections opposite the brake shoe support surface, a leaf spring spanning said projections, a pressure bar to apply pressure to said spring having spaced arms extending normal to the bar, and grooves formed on the bottom and top of said brake shoe support to guide said spaced arms in slidable relation thereto.

4. In a brake shoe lining fixture for bonding brake lingings on to brake shoes utilizing an arcuate brake shoe support and an encircling metal band to exert pressure on the lining against the brake shoe, that improvement which comprises:

a brake shoe support arcuate in shape having an arcuate recess to receive a brake shoe, buffer blocks at the end of said recess having a circumferentially extended curved surface circumferentially adjacent and tangential to the outer end surface of an assembled brake lining to carry the pressure band tangentially away from the curve at the end of the brake linings, said buffer block surfaces having a radial dimension slightly less than the curvature of the assembled brake linings to protect the corner ends of the brake lining against crushing, and circumferentially spaced radial projections on one side of said arcuate recess serve to position the brake shoe and the lining on said support prior to tensioning of the band encircling said lining.

* * * * *